United States Patent [19]

Choi et al.

[11] Patent Number: 6,156,401
[45] Date of Patent: Dec. 5, 2000

[54] OXYGEN BARRIER RESIN COMPOSITION AND PRODUCT CONTAINING THE SAME

[75] Inventors: Weon-Jung Choi; Oh-Bin Kwon; Kwang-Sik Jung, all of Taejon, Rep. of Korea

[73] Assignee: SK Corporation, Seoul, Rep. of Korea

[21] Appl. No.: 09/395,293

[22] Filed: Sep. 13, 1999

[30] Foreign Application Priority Data

Sep. 16, 1998 [KR] Rep. of Korea ...................... 98-38243

[51] Int. Cl.⁷ .................................................. B29D 22/00
[52] U.S. Cl. ............................................................. 428/35.7
[58] Field of Search ............................................. 428/35.7

[56] References Cited

U.S. PATENT DOCUMENTS

| | | | |
|---|---|---|---|
| 4,261,482 | 4/1981 | Yamada | 222/215 |
| 4,753,845 | 6/1988 | Sumi | 428/327 |
| 4,950,515 | 8/1990 | Mason | 428/36.92 |
| 4,971,864 | 11/1990 | McCord | 428/516 |
| 5,194,109 | 3/1993 | Yamada | 156/94 |
| 5,278,237 | 1/1994 | Kita | 525/207 |
| 5,356,990 | 10/1994 | Pucci | 525/57 |
| 5,728,467 | 3/1998 | Watanabe | 428/411.1 |
| 5,827,615 | 10/1998 | Touhsaent | 428/463 |
| 6,011,115 | 1/2000 | Miharu | 525/57 |

FOREIGN PATENT DOCUMENTS

| | | | |
|---|---|---|---|
| 015556 | 9/1980 | European Pat. Off. | C08L 23/00 |
| 0210725 | 2/1987 | European Pat. Off. | B65D 1/00 |

*Primary Examiner*—Paul R. Michl
*Attorney, Agent, or Firm*—Abelman, Frayne & Schwab

[57] ABSTRACT

Disclosed are an oxygen barrier resin composition and products containing the resin. The resin composition comprises 20 to 80 wt % of an ethylene-vinyl alcohol copolymer, 5 to 79 wt % of an ethylene copolymer, and 1 to 30 wt % of a compatibilizer obtained between a random copolymer of ethylene-maleic anhydride-alkyl(meth)acrylate and a polyamide oligomer ranging, in molecular weight, from 1,000 to 5,000. The compatibilizer functions in such a way that the main chain of the polyamide penetrates into the ethylene-vinyl alcohol phase while the main chain of the ethylene-alkyl(meth)acrylate exists in the ethylene copolymer phase. The resin composition is superior in both melt-moldability and compatibility, providing films, sheets or bottles with superb appearance (transparency), mechanical strength and oxygen barrier.

11 Claims, No Drawings

OXYGEN BARRIER RESIN COMPOSITION AND PRODUCT CONTAINING THE SAME

BACKGROUND OF THE INVENTION

1. Field of the Invention

The present invention relates to an oxygen barrier resin composition and a product containing the same. More particularly, the present invention relates to the use of a compatibilizer in compounding an ethylene-vinyl alcohol copolymer (hereinafter referred to as "EVOH") with an ethylene copolymer, thereby providing good appearance, oxygen barrier and mechanical properties to molded properties to molded products.

2. Description of the Prior Art

Resins based on polyolefins, such as polyethylene and polypropylene, are widely used in various fields by virtue of their superior moldability, mechanical properties and moisture barrier. They are also highly permeable to gas, but this acts to limit the application of polyolefin-based resins for food package films which generally require impermeability (barrier) to gas, especially oxygen. For this reason, polyolefin-based resins, along with EVOH superior in oxygen barrier, are formed into food package films, sheets or bottles of multilayer structures through coextrusion, lamination or coating.

With excellent gas barrier and transparency, EVOH is favorably used to provide a gas barrier function upon molding multilayer plastic products. However, recruitment of EVOH is restrained by its cost which is much higher than those of polyolefins. To avoid increasing the cost of such multilayer products, the EVOH layer is made as thin as possible. Thinning the EVOH layer may be a viable option if the multilayer products are maintained uniform in quality. Actually, the opposite is true.

As an alternative to reduce the cost of the multilayer plastic products, there was suggested the compounding of EVOH with inexpensive polyethylene. However, the two components are short of compatibility with each other and thus, are difficult to blend. When a mixture of the two components is used as incompletely blended, the resulting films or sheets appear non-uniform and are poor in mechanical strength. In fact, they are compounded with the aid of a third component, a so-called "compatibilizer" which aids to increase the compatibility therebetween. Now, selection of a compatibilizer for improving the mechanical strength and appearance of products has been an important technical subject.

European Pat. Nos. 15,556 (1980) and 210,725 (1987) and U.S. Pat. No. 4,971,864 (1990) and U.S. Pat. No. 5,356,990 (1994), for example, disclose compatibilizers which comprise polyethylene grafted with polar compounds such as maleic anhydride, asserting that there can be obtained films which show improved oxygen barrier and mechanical properties. However, the products are still poor in appearance such as transparency and thickness variation. Where contents of the compatibilizers are increased to improve the compatibility between EVOH and polyethylene, the resulting resins show poor melt-moldability and oxygen barrier, which must be surmounted for commercialization.

SUMMARY OF THE INVENTION

Therefore, it is an object of the present invention to overcome the above problems encountered in prior arts and to provide an oxygen barrier resin composition which can be applied for a gas barrier layer of a multilayer structure product.

It is another object of the present invention to provide an oxygen barrier resin composition which is superior in melt-moldability and compatibility to allow the formation of a multilayer structure product which shows good appearance, mechanical strength and oxygen barrier property.

It is a further object of the present invention to provide a molded product having at least one layer made of such an oxygen barrier resin composition.

In accordance with an aspect of the present invention, there is provided an oxygen barrier resin composition comprising 20 to 80 wt % of an ethylene-vinyl alcohol copolymer, 5 to 79 wt % of an ethylene copolymer, and 1 to 30 wt % of a compatibilizer obtained by reacting a random copolymer of ethylene-maleic anhydride-alkyl(meth)acrylate and a polyamide oligomer ranging, in molecular weight, from 1,000 to 5,000.

In accordance with another aspect of the present invention, there is provided a multilayer structure of a film, sheet or bottle having at least one layer made of such an oxygen barrier resin composition.

DETAILED DESCRIPTION OF THE INVENTION

The present invention contemplates an oxygen barrier resin which comprises (a) 20 to 80 wt % of an ethylene vinyl alcohol copolymer (EVOH), (b) 5 to 79 wt % of ethylene copolymer and (c) 1 to 30 wt % of a compatibilizer resulting from the reaction between an ethylene-maleic anhydride-alkyl(meta)acrylate random copolymer and a polyamide oligomer with a molecular weight of 1,000~5,000.

For EVOH, there is used at least one ethylene-vinyl alcohol copolymer which is obtained by the saponification of ethylene-vinyl acetate copolymers. When the EVOH has a saponification degree of less than 90%, insufficient oxygen barrier results. The higher the saponification degree is, the better that oxygen barrier is. A preferable ethylene content in the EVOH is within the range from 10 to 50 mol %. For example, if the ethylene content is below 10 mol %, the resin is of poor processability and thus, difficult to mold by melting. On the other hand, if the ethylene content is over 50 mol %, the resin has insufficient oxygen barrier.

An available ethylene copolymer in the present invention is selected from the group consisting of linear low density polyethylene (LLDPE), low density polyethylene (LDPE), high density polyethylene (HDPE), a copolymer of ethylene-vinyl acetate, a copolymer of ethylene-unsaturated acid derivative, and mixtures thereof with preference to a LLDPE copolymer of ethylene and α-olefin. Useful are α-olefins which contain 4~8 carbon atoms, exemplified by but-1-ene, hex-1-ene, 4-methylpent-1-ene, and oct-1-ene and mixtures thereof. The unsaturated acid derivative is selected from the group consisting of (meth)acrylic acid, alkyl(meth)acrylic acid and the mixture thereof.

Functioning as a compatibilizer for compounding the EVOH with the ethylene copolymer, the c) component is obtained by melt-extruding a mixture comprising 50 to 98 weight parts of a random copolymer of ethylene-maleic anhydride-alkyl(meth)acrylate and 2 to 50 weight parts of a polyamide oligomer. When the random copolymer of ethylene-maleic anhydride-alkyl(meth)acrylate is present at an amount less than 50 weight parts, an excess of unreacted polyamide oligomer remains having a negative influence on the morphology and melt-moldability of the resin. In result, the resin is deteriorated in oxygen barrier. On the other hand, if the random copolymer is used excessively, the reaction with the polyamide oligomer occurs insufficiently so that the effect of the present invention is brought about only to minor extent. A reaction is believed to occur between the terminal amine group of the polyamide oligomer and acid anhydride groups of the ethylene-maleic anhydride-alkyl(meth) acrylate random copolymer. Through this reaction, a compatibilizer is obtained which is efficient to the EVOH and the ethylene copolymer both. In result, the compatibilizer has a structure of an ethylene-alkyl(meth)acrylate copolymer which the backbone of the polyamide is grafted to, instead of maleic anhydride. When preparing the resin composition of the present invention, the compatibilizer performs its role in such a way that the main chain of the polyamide penetrates into the EVOH phase while the main chain of the ethylene-alkyl(meth)acrylate exists in the ethylene copolymer phase. In addition to guaranteeing the compounding between the EVOH and the ethylene copolymer, this compatibilizer has a further advantage in that, because the modification of maleic anhydride which makes the direct reaction of compatibilizer with EVOH minimize, so as to inhibit the formation of crosslinks in the resin at its maximum, thereby bringing about a great improvement in the melt-moldability, appearance and physical properties of the resin.

In the ethylene-maleic anhydride-alkyl(meth)acrylate random copolymer, the alkyl group is a hydrocarbon compound of 1 to 12 carbon atoms and the alkyl(meth)acrylate can be a mixture. The random copolymer may be prepared by the radical polymerization of ethylene, maleic anhydride and alkyl(meth)acrylate. Upon the radical polymerization, the polymerization ratio between the ethylene moiety and the comonomer moieties can be controlled. In the random polymer, the maleic anhydride is preferably present at an amount of 0.1 to 10 weight parts while the preferable amount of the alkyl(meth)acrylate is within the range from 3 to 30 weight parts. Maleic anhydride plays an important role in reacting with the polyamide oligomer. For example, less than 0.1 weight parts of maleic anhydride cannot allow the effect of the present invention. On the other hand, when maleic acid is present at an amount more than 10 weight parts in the random copolymer, crosslinking is highly apt to occur in the resin composition. Crosslinked resin compositions are deteriorated in melt-moldability and the products molded from them have poor appearance.

As for the alkyl(meth)acrylate, it functions to reduce the crystallinity of the copolymer to improve its transparency as well as to lower its melting point. Therefore, the resulting compatibilizer is of good fluidity when melting the resin, so that it has an excellent compatibility for the EVOH and the ethylene copolymer. These effects cannot be obtained with less than 3 weight parts of alkyl(meth)acrylate. More than 30 weight parts of the alkyl(meth)acrylate causes the compatibilizer to exhibit poor compatibility with the ethylene copolymer. Now, commercially available, representative examples of the random copolymer include Lotader® from Elf Atochem Company and Adtex® from Japan Polyolefin.

Polyamide available in the present invention is selected from the group consisting of polyamide-6, polyamide-6/66, polyamide-12 and polyamide-6/12. The polyamide oligomer can be prepared by adding a molecular weight controller, such as primary amine, in the course of the manufacture of the polyamide. In the present invention, the polyamide oligomer preferably ranges, in molecular weight, from 1,000 to 5,000. If the polyamide oligomer has a molecular weight more than 5,000, the terminal amines are relatively few, so that it has less frequent opportunity to react with the copolymer containing maleic anhydride. In result, the effect at which the present invention aims is not obtained. In addition, the large molecular weight polyamide shows poor fluidity upon melt extrusion. On the other hand, if the molecular weight of the polyamide is less than 1,000, the reaction between the polyamide and the ethylene-maleic anhydride-alkyl(meth)acrylate copolymer does not occur well because the two components are not well blended upon melting.

After undergoing a dry blending or melt blending process in accordance with the production conditions of products, the composition of the present invention is introduced into, for example, an extruder to produce the products.

By use of a blown molding, cast molding or extrusion molding machine, the composition of the present invention can be processed into films, sheets and bottles of various multilayer structures, exemplified as A, A/B, A/B/C, B/A/B, C/B/A/B/C, C/A/C/B/C, C/B/C/A/C/B/C, etc, wherein A is the resin composition layer according to the present invention, B is an adhesive resin layer, and C is a thermoplastic resin layer. In these multilayer structures, useful for the adhesive resin layer is a polyolefin, such as polyethylene or polypropylene, which is grafted with an unsaturated acid, such as maleic acid. For the thermoplastic resin layer, polyethylene, polypropylene, polystyrene or polyamide may be exemplified.

Optionally, the oxygen barrier composition of the present invention further comprises a processing aid, dye, an antioxidant, a light stabilizer, a plasticizer, and the like. Particularly, a plasticizer for EVOH, such as glycerol or p-toluene sulfone amide, gives rise to an improvement in the flexibility of the barrier layer.

A better understanding of the present invention may be obtained in light of the following examples which are set forth to illustrate, but are not to be construed to limit the present invention.

In the following examples, samples were measured for oxygen barrier property with the aid of a gas permeation measuring meter, such as Model Toyoseiki MC1, B-type, after being allowed to stand at a temperature of 23° C. and a relative humidity of 50% for one day. The unit for oxygen permeability is $cc/m^2.day.atm$. They were also measured for haze using a turbidimeter such as manufactured by Nippon Denshoku, Japan, identified as 300A turbidimeter. The measured units are represented by %.

The melt indices of the samples were measured at 190° C. or 210° C. under a load of 2,160 g, according to ASTM D-1238. Unit is g/10 min. For the density of each sample, a process followed the indication of ASTM D-1505. The measured units are represented by g/cm$^3$.

In the following Table 1, the EVOH and ethylene copolymers used in the experiments are shown, along with their melt indices.

TABLE 1

| Components | | Resins | Melt Index (2,160 g, g/10 min) 190° C. | 210° C. |
|---|---|---|---|---|
| EVOH | E-1 | Ethylene Content 44 mol % | — | 13 |
| | E-2 | Ethylene Content 32 mol % | — | 12 |
| Ethylene | P-1 | LLDPE | 0.7 | — |
| Copolymer | P-2 | LLDPE | 1.0 | — |
| | P-3 | [1]E-VA (VA Content 15 wt %) | 1.5 | — |

[1]Ethylene-Vinyl acetate copolymer

The components for the compatibilizer of the present invention are given, along with their physical properties, in Table 2, below.

TABLE 2

| Components | Resins | MI 190° C. | Density (g/cm$^3$) |
|---|---|---|---|
| C-1 | [1]E-MAH-MAc | 10.9 | 0.937 |
| C-2 | [2]E-MAH-MAc | 13.7 | 0.935 |
| C-3 | [3]E-MAH-MAc | 7.6 | 0.943 |
| C-4 | [4]MAH-g-LLDPE | 1.5 | 0.919 |
| PAO | [5]PA-6, Mw 2,000 | — | — |
| C-5 | C-1/PAO = 90/10 wt parts product | 5.7 | — |
| C-6 | C-1/PAO = 80/20 wt parts product | 2.5 | — |
| C-7 | C-2/PAO = 90/10 wt parts product | 6.5 | — |
| C-8 | C-2/PAO = 80/20 wt parts product | 2.7 | — |
| C-9 | C-3/PAO = 90/10 wt parts product | 2.1 | — |

[1]Ethylene-maleic anhydride-methyl acrylate random copolymer: Antex ® ET 182 from Japan Polyolefin
[2]Adtex ® ET 184M from Japan Polyolefin
[3]Lotader ® 3410 from Elf Atochem
[4]Maleic anhydride-grafted-LLDPE: Adtex ® ER 615F from Japan Polyolefin
[5]Polyamide-6

Preparation of Polyamide Oligomer (PAO)

In a 500 ml pressure reactor was charged 170 g of ε-caprolactam, 10.9 g of dodecylamine and 3.9 g of water which were then allowed to react at 260° C. for 2 hours in a closed state with stirring. When the pressure of the reactor was increased to 4.5 kg/cm$^2$, a pressure valve was opened to reduce the pressure within the reactor to the atmospheric pressure. Again, the reaction was conducted at 260° C. for 2 hours, after which the reactor was cooled to room temperature. The solid thus obtained was pulverized to a powder which was then stirred in boiling water, filtered and dried for 8 hours in a vacuum oven maintained at 80° C. The product was found to be a polyamide oligomer with a melting point of 220° C. as measured by a thermal analyzer.

Preparation of Compatibilizers C-5 to C-9

Dry blending was conducted as indicated in Table 2. Using a twin screw extruder with a diameter of 19 mm for the screws, the blends were melt-extruded at 130–180–210–220–210° C. into pellets.

EXAMPLES I TO V AND COMPARATIVE EXAMPLES I TO V

After being dry blended in a tumble mixer, mixtures, each 2 kg in total, consisting of 50 wt % of E-2, 40 wt % of P-1 and 10 wt % of a compatibilizer were melt extruded at 190–200–210–210–210° C. into pellets by use of a twin screw extruder with a diameter of 19 mm for the screws. After being dried at 60° C. for 12 hours, the pellets were used for the barrier layer in five-layer films having a polyethylene/adhesive layer/barrier layer/adhesive layer/polyethylene structure which could be formed by a five-layer casting apparatus. In the five-layer structure, the polyethylene layer was made of a linear low density polyethylene with a melt index of 2.8 (190° C., 2.16 kg) while the adhesive layer was made of maleic acid-modified (grafted) linear low density polyethylene (MAH-g-LLDPE) with a melt index of 3.5 (190° C., 2.16 kg). The five-layer structure was made 30/10/15/10/30 μm thick. A measurement was made of the physical properties of the five-layer films and the results are given in Table 3, below.

TABLE 3

| Nos. of Exmp. | Compati. | Barrier layer Pellet MI (190° C., 2.16 kg) | 5-Layer Film Properties | | |
|---|---|---|---|---|---|
| | | | Thickness Deviation | Haze (%) | O$_2$ Permeability (cc/m$^2$ · day · atm) |
| I | C-5 | 1.06 | ○ | 12 | 2.8 |
| II | C-6 | 1.50 | ○ | 13 | 2.0 |
| III | C-7 | 1.20 | ⊚ | 13 | 1.8 |
| IV | C-8 | 1.60 | ○ | 14 | 1.7 |
| V | C-9 | 0.36 | ⊚ | 11 | 2.5 |
| C.I | C-1 | 0.08 | x | 16 | 2.9 |
| C.II | C-2 | 0.11 | x | 17 | 2.7 |
| C.III | C-3 | 0.04 | x | 30 | 3.8 |
| C.IV | C-4 | 1.00 | Δ | 22 | 3.1 |

⊚: within ±10%;
○: ±10–15%;
Δ: ±15–20%;
x: ±20% or higher

As apparent from the data of Table 3, the compositions according to the present invention can be formed into films which are superior to the conventional compositions of Comparative Examples in oxygen barrier as well as in thickness deviation and transparency (low haze degree) by virtue of excellent melt-moldability.

EXAMPLES VI TO IX AND COMPARATIVE EXAMPLES V TO VII

After being dry blended, mixtures, each 20 kg in total, consisting of EVOH, a compatibilizer and an ethylene copolymer as indicated in Table 4, below, were fed into a middle layer extruder of a 3-layer blown film machine, such as manufactured by Kiefel, Germany, identified as Rotex 40S/30S/40S while maleic anhydride-graft-polyethylene, an adhesive resin, was fed into an inside and an outside extruder of the machine, so as to 3-layer films each of which was 500 mm width with a thickness of 55 μm. The middle layer extruder was maintained at 210° C. and employed a screw whose screw compression ratio was 3.3:1. The individual layers of the 3-layer structures were observed to be 20/15/20 μm in average thickness as measured by an electron microscope, such as that manufactured by Philips, identified as SEM 515.

TABLE 4

| Nos. of Exmp. | Weight Ratios of ¹EVOH/C/PE | Haze (%) | O₂ Permeability (cc/m² · day · atm) |
|---|---|---|---|
| VI | E-2/C-5/P-1 = 60/7/33 | 11.2 | 2.0 |
| VII | E-1/C-8/P-1 = 60/10/30 | 9.4 | 12.5 |
| VIII | E-2/C-8/P-1 = 50/7/43 | 12.8 | 4.9 |
| IX | E-2/C-9/P-2 = 60/5/35 | 11.6 | 2.3 |
| C.V | E-2/C-1/P-1 = 60/5/35 | 23.6 | 10.1 |
| C.VI | E-1/C-2/P-1 = 60/10/30 | 27.5 | 45.4 |
| C.VII | E-2/C-4/P-2 = 60/5/35 | 27.3 | 12.5 |

¹EVOH/compatibilizer/polyethylene

The data of Table 4 demonstrate that, as compared with the conventional compositions of Comparative Examples, the compositions according to the present invention can be formed into films which have much better physical properties, including haze and oxygen permeability.

EXAMPLES X AND XII AND COMPARATIVE EXAMPLES VIII AND X

After being dry blended in a tumble mixer, mixtures, each 50 kg in total, composed of EVOH, ethylene copolymers and a compatibilizer, were melt extruded at 190–200–210–210–210° C. into pellets by use of a twin screw extruder with a diameter of 40 mm for the screws. The pellets were dried at 60° C. for 12 hours and then, fed into a C-extruder of a 5-layer, air cooling type, blown film machine having five extruders (A/B/C/D/E) 50/50/60/50/60 mm in diameter, respectively, to form films 1,200 mm width, under the following conditions.

A layer and E layer: LLDPE (MI 1.0, Density 0.919)

B layer and D layer: MAH-g-LLDPE (MI 1.2, Density 0.90)

Processing Temp.:

A, B, D, E extruders: 190–200–210–215° C.

C extruder: 200–210–215–220° C.

Adapter: 225° C.

Die: 220° C.

Output Rate: 200 kg/hour

The films were 62 μm thick, in total, which was divided into 15/10/12/10/15 μm for the A/B/C/D/E layers, respectively.

molded into films which show good appearance with excellent oxygen barrier and mechanical strength.

As described hereinbefore, the resin compositions employing the compatibilizers according to the present invention are better in both melt-moldability and compatibility, compared with the compositions employing conventional compatibilizers. Therefore, the films, sheets or bottles which employ the compositions according to the present invention as their barrier layers can be endowed with superb appearance (transparency), mechanical strength and oxygen barrier.

The present invention has been described in an illustrative manner, and it is to be understood that the terminology used is intended to be in the nature of description rather than of limitation. Many modifications and variations of the present invention are possible in light of the above teachings. Therefore, it is to be understood that within the scope of the appended claims, the invention may be practiced otherwise than as specifically described.

What is claimed is:

1. An oxygen barrier resin composition, comprising:
   (a) 20~80 wt % of an ethylene-vinyl alcohol copolymer (EVOH);
   (b) 5~79 wt % of an polyethylene; and
   (c) 1–30 wt % of a compatibilizer obtained by reacting a random copolymer of ethylene-maleic anhydride-alkyl (meth)acrylate and a polyamide oligomer ranging, in molecular weight, from 1,000 to 5,000 to improve compatibility between the EVOH and the polyethylene.

2. The oxygen barrier resin composition as set forth in claim 1, wherein the ethylene-vinyl alcohol copolymer is obtained by saponifying an ethylene-vinyl acetate copolymer with an ethylene content of 10 to 50 mol % to at least 90%.

3. The oxygen barrier resin composition as set forth in claim 1, wherein the polyethylene is at least one selected from the group consisting of high density polyethylene, low density polyethylene, and linear low density polyethylene.

4. The oxygen barrier resin composition as set forth in claim 3, wherein the linear low density polyethylene is a copolymer of ethylene and α-olefin.

5. The oxygen barrier resin composition as set forth in claim 4, the α-olefin is at least one selected from the group consisting of but-1-ene, hex-1-ene, 4-methylpent-1-ene and oct-1-ene.

6. The oxygen barrier resin composition as set forth in claim 1, wherein the random copolymer of ethylene-maleic

TABLE 5

| Nos. Of Exmp. | Weight Ratios of EVOH/C/PE¹ | Haze (%) | O₂ Permeability (cc/m² · day · atm) | Tensil Strength at Break (kg/cm²) (ASTM D638) Axial/transverse |
|---|---|---|---|---|
| X | E-2/C-8/P-1 = 60/7/33 | 12.6 | 2.7 | 218/175 |
| XI | E-1/C-9/P-2 = 50/10/30 | 13.4 | 15.3 | 210/184 |
| XII | E-2/C-5/P-3 = 60/7/33 | 10.5 | 3.4 | 223/190 |
| C.VIII | E-2/C-2/P-1 = 60/7/33 | 30.5 | 25.8 | 169/113 |
| C.IX | E-1/C-3/P-2 = 50/10/30 | 33.2 | 83.2 | 185/117 |
| C.X | E-2/C-1/P-3 = 60/6/34 | 25.3 | 11.2 | 206/115 |

¹EVOH/compatibilizer/polyethylene

From the data of Table 5, it is apparent that the compositions comprising compatibilizers, EVOH and ethylene copolymers, according to the present invention can be anhydride-alkyl(meth)acrylate is reacted with the polyamide oligomer at a weight ratio of random copolymer:polyamide oligomer from 98:2 to 50:50.

7. The oxygen barrier resin composition as set forth in claim 6, wherein the alkyl group of alkyl(meth)acrylate is a hydrocarbon compound of 1 to 12 carbon atoms.

8. The oxygen barrier resin composition as set forth in claim 1, wherein the polyamide oligomer is at least one selected from polyamide-6, polyamide-6/66, polyamide-12 and polyamide-6/12.

9. An oxygen barrier film, comprising at least one layer applied by the composition of claim 1.

10. An oxygen barrier sheet, comprising at least one layer applied by the composition of claim 1.

11. An oxygen barrier bottle, comprising at least one layer applied by the composition of claim 1.

* * * * *